US006549927B1

(12) United States Patent
Erle et al.

(10) Patent No.: US 6,549,927 B1
(45) Date of Patent: Apr. 15, 2003

(54) CIRCUIT AND METHOD FOR SUMMING MULTIPLE BINARY VECTORS

(75) Inventors: Mark Alan Erle, Poughkeepsie, NY (US); Michael Robert Kelly, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,773

(22) Filed: Nov. 8, 1999

(51) Int. Cl.[7] ................................................. G06F 7/50

(52) U.S. Cl. ........................................................ 708/709

(58) Field of Search .................................. 708/709, 706

(56) References Cited

U.S. PATENT DOCUMENTS

| | | | | | |
|---|---|---|---|---|---|
| 3,603,776 A | * | 9/1971 | Weinberger | ................. | 708/706 |
| 3,636,334 A | * | 1/1972 | Svoboda | ..................... | 708/709 |
| 3,675,001 A | * | 7/1972 | Singh | .......................... | 708/709 |
| 3,723,715 A | * | 3/1973 | Chen et al. | ................. | 708/709 |
| 5,036,483 A | * | 7/1991 | Virtue | ......................... | 708/707 |
| 5,097,436 A | * | 3/1992 | Zurawski | .................... | 708/711 |
| 5,471,413 A | * | 11/1995 | Sali et al. | ................... | 708/706 |

* cited by examiner

Primary Examiner—David H. Malzahn
(74) Attorney, Agent, or Firm—Joseph P. Lally; Tom Tyson; Volel Emile

(57) ABSTRACT

A method and circuit for summing multiples vectors is disclosed. The method includes receiving a set of input vectors and generating a set of decoded summation vectors. Each of the set of decoded summation vectors indicates the value of at least a portion of the vector sum. The method further includes generating a set of decoded carry vectors. Each carry vector is used to select the summation vector for an adjacent portion of the vector sum from a set of preliminary summation vectors. In one embodiment, the method further includes counting the number of high bits in each bit position of the input vectors and generating decoded high bit count vectors based upon the counting to facilitate the generation of decoded summation vectors. In one embodiment, the set of preliminary vectors includes an initial preliminary summation vector and a set of adjacent summation vectors. In this embodiment each adjacent summation vector is achieved with a 1-bit rotation of the preceding adjacent summation vector. In another embodiment, the invention contemplates a method of adding multiple binary vectors in which a first decoded summation vector indicative of a first portion of a vector sum is generated and a first decoded carry vector indicative of the carry from a first portion of the vector sum is generated. An initial second decoded summation vector corresponding to a second portion of the vector sum is then generated and a set of preliminary summation vectors generated from the initial second summation vector. Each of the preliminary summation vectors is rotated by one bit position from the adjacent vectors in the set of preliminary summation vectors. One of the set of preliminary summation vectors is then selected as the second summation vector based upon the value of the first carry vector. In one embodiment, the value indicated by the first carry vector indicates the number of times the selected second summation vector was rotated from the initial summation vector.

20 Claims, 3 Drawing Sheets

CIRCUIT AND METHOD FOR SUMMING MULTIPLE BINARY VECTORS

BACKGROUND

1. Field of the Present Invention

The present invention generally relates to the field of digital circuits and more particularly to a circuit for adding multiple vectors.

2. History of Related Art

In VLSI design, occasions frequently arise in which the sum of multiple binary vectors is required such as in the alignment of operands for multiply-add instructions. Frequently, the sum generated by such an operation is used to steer data. As processor speeds increase into and beyond 1 GHz, it becomes highly desirable to generate the necessary sum with a minimum of delay. Typically, however, adder circuits are designed for use with only a pair of input vectors. If the number of input vectors increases, a performance penalty is paid to incorporate the additional operands into the final result. In addition, these circuits typically implement multiple "vertical" levels of logic to generate a result. Each level of logic adds delay to the time required to generate a result. In addition, traditional adder circuits typically produce a binary encoded result that must be manipulated before it can be used as the select signal suitable for steering data. Therefore it would be highly desirable to implement a circuit for computing a multiple vector summation with a delay that does not increase significantly with the number of input vectors. Moreover, it would be desirable if the implemented solution generated a result that was suitable for use with a multiplexer or other selection circuitry.

SUMMARY OF THE INVENTION

The problems identified above are in large part addressed by a method and calculation circuit suitable for adding multiple binary vectors. The method includes receiving a set of input vectors and generating a set of decoded summation vectors. Each of the set of decoded summation vectors indicates the value of at least a portion of the vector sum. The method further includes generating a set of decoded carry vectors. Each carry vector is used to select the summation vector for an adjacent portion of the vector sum from a set of preliminary vectors. In one embodiment, the method further includes counting the number of high bits in each bit position of the input vectors and generating decoded high bit vectors based upon the counting to facilitate the generation of decoded summation vectors. In one embodiment, the set of preliminary vectors includes an initial preliminary summation vector. In another embodiment, the invention contemplates a method of adding multiple binary vectors in which a first decoded summation vector indicative of a first portion of a vector sum is generated and a first decoded carry vector indicative of the carry from a first portion of the vector sum is generated. An initial second decoded summation vector corresponding to a second portion of the vector sum is then generated and a set of preliminary summation vectors generated from the initial second summation vector. Each of the preliminary summation vectors is rotated by one bit position from adjacent vectors in the set of preliminary summation vectors. One of the set of preliminary summation vectors is then selected as the second summation vector based upon the value of the first carry vector. In one embodiment, the value indicated by the first carry vector indicates the number of times the selected second summation vector was rotated from the initial summation vector. The method may further include selecting a second carry vector from a set of preliminary second carry vectors with the first carry vector.

BRIEF DESCRIPTION OF THE DRAWING

Other objects and advantages of the invention will become apparent upon reading the following detailed description and upon reference to the accompanying drawing in which.

Figure 1:
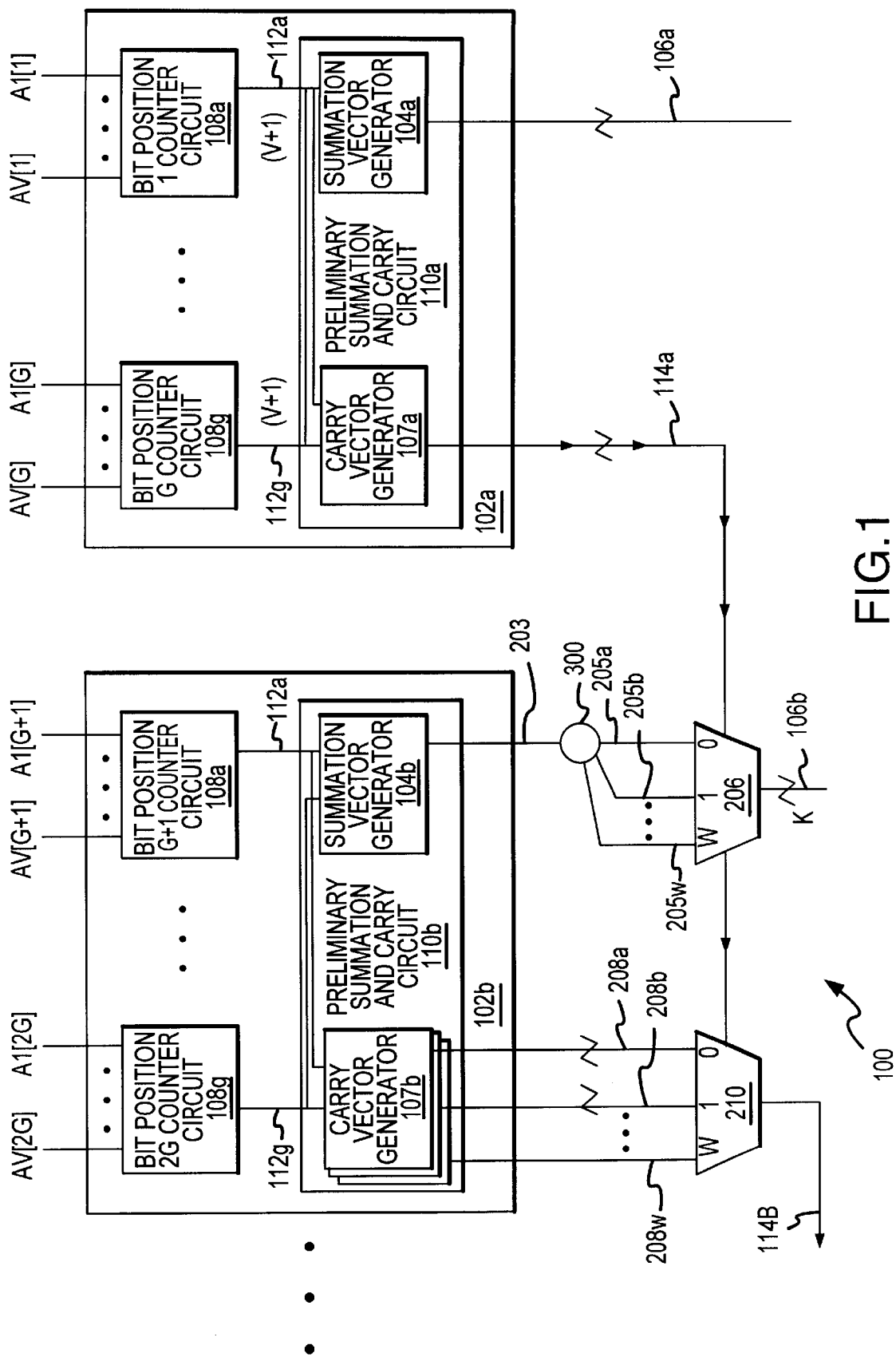
FIG. 1 is a block diagram of a multiple vector summing circuit according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, an embodiment of a calculation circuit 100 according to one embodiment of the invention suitable for adding a set of V binary vectors (notated as $A_1$ through $A_v$). Each vector $A_x$ includes n bits. The bits of each vector $A_x$ are notated in FIG. 1 as $A_x[i]$ where i indicates the bit position. Thus, the bits of vector $A_1 = A_1[n], A_1[n-1], \ldots A_1[1]$. Circuit 100 is configured to received the set of V binary vectors and to generate a fully decoded set of output vectors 106, two of which (output vectors 106a and 106b) are shown in FIG. 1. Each output vector 106 represents a portion of the sum of the input vectors. Each fully decoded output vector 106 includes a set of elements. Each output vector 106 may be thought of as a special purpose bus in which each wire or interconnect of the bus corresponds to an element in the vector. The width of each output vector 106 (i.e., the number of elements in each output vector 106) is $2^G$ where G represents the number of bits in each grouping of circuit 100 as described in greater detail below. If, for example, circuit 100 is organized with a 3-bit grouping, the width of each output vector 106 will be $2^3$ (i.e., 8). In this example, each output vector 106 will represent the value of 3 bits of the sum of vectors $A_1$ through $A_v$. To illustrate, the first output vector 106a for an embodiment of circuit 100 organized with a 3-bit grouping will represent the value of the lowest three bit positions of the sum of vectors $A_1$ through $A_v$, the second output vector 106b will represent the next lowest three bits positions, and so forth. Consider the case of a circuit 100 designed to accommodate 4 binary vectors and organized with 3-bit groupings, where the values of the respective vectors are $V_1=10$ (decimal), $V_2=24$, $V_3=17$, and $V_4=7$. The sum of the four vectors is 58 (decimal) or 111010 binary. In this example, the first output vector 106a would represent the value of the three low order bits 010 while the second output vector 106b would represent the upper three bits 111. In this manner, each output vector 106 represents the value of a group of bits in the binary representation of the sum of the input vectors.

In the preferred embodiment, each output vector 106 is a fully decoded vector in which each possible value of the represented group is associated with a unique element in the vector. In the previous example, in which each output vector represents the value of a 3-bit group, it will be appreciated that the group can assume one of eight possible binary states. Each of the states corresponds to one of the eight elements comprising output vector 106. If the 3-bit group is in a first state (e.g., 000), a first element of the output vector is asserted while all other elements of the vector are negated and, thus, the value of output vector 106 corresponding to the 000 condition would for example be 00000001. If the 3-bit group is in a second state, a second element of vector 106a is asserted while all other elements of the negated (i.e. 00000010), and so forth. The use of decoded output vectors is useful in a variety of applications including applications where the result of the vector summation is used to steer data in which the decoded vectors 106 can be used as select signals for multiplexer circuitry.

In the embodiment depicted in FIG. 1, circuit 100 includes a first block 102a and at least one additional block 102b. First block 102a is configured to receive a portion of each of the input vectors $A_1$ through $A_v$ and to produce one of the fully decoded output vectors 106a based upon the received information. Circuit 100 is organized into groupings, where the number of bits in each grouping determines the portion of vectors $A_1$ through $A_x$ that are received by first block 102a. In the embodiment depicted in FIG. 1, circuit 100 is organized into groupings of G bits. In this embodiment, first block 102a receives the low order G bits from each input vector $A_1$ through $A_v$. Similarly, second block 102b receives the second group of G bits from each of the input vectors. First block 102a generates the first output vector 106a as a fully decoded representation of the low order G bits of the summation of the input vectors $A_1$ through $A_x$ as described previously. In addition, first block 102a generates a carry vector 114a that selects the appropriate summation and carry vector from a set of summation and carry vectors generated by second block 102b. The function of first block 102a is to 1) perform a summation function on the low order G bits of the V input vectors, 2) generate a $2^G$-wide output vector 106a that represents the low order G bits of that summation and 3) generate a carry vector 114a that represents the portion of the summation that could not be represented in output vector 106a. In the example given previously, in which $V_1$=10 (decimal), $V_2$=24, $V_3$=17, and $V_4$=7 and in which circuit 100 is organized with a 3-bit grouping, the low order three bits of each vector are received by first block 102a. The low order three bits for V1, V2, V3, and V4 respectively are 010, 000, 001, and 111. The summation of these binary values is 1010. Output vector 106a would represent the low order three bits of this summation (i.e., 010) by asserting one of its eight elements. Carry vector 114a would represent the high order 1 (decimal 8) that could not be contained the low order three bits.

In the preferred embodiment, carry vector 114a is a fully decoded representation of the carry information resulting from the summation in first block 102a. In this embodiment, the number of elements of carry vector 114a is a function of the number of vectors V and the number of bits G represented in each grouping. The maximum value of the summation of V vectors each comprising G bits is $V*(2^G-1)$, where $2^G-1$ represents the maximum value that can be represented with G bits. Thus, the maximum value of a summation of four 3-bit vectors is $4*(2^3-1)=28$. In a circuit organized with 3-bit groupings, the output vector 106a represents the low order G bits of the vector sum. For a 3-bit grouping, output vector 106a represents the value of the 1's bit position, the 2's bit position, and the 4's bit position. The carry vector 114a represents the quantity that is carried from first block 102a. In the 3-bit grouping example, therefore, the carry vector 114a represents the number of 8's that are carried from the summation produced by first block 102a to second block 102b. Quantitatively, the number of 8's carried from first block 102a to second block 102b, which is represented by vector 114a, is the integer portion of the value $(A_1[1:3]+A_2[1:3]+A_3[1:3]+A_4[1:3])/8$, where $A_x[1:3]$ indicates a 3-bit binary vector comprised of bits 1, 2, and 3 of the vector $A_x$. More generally, in a circuit 100 organized in G-bit groupings, the carry vector 114a represents the value $INT[(A_1[1:G]+...+A_v[1:G])/2^G]$. If the summation of the low order 3 bits of a given set of 4 input vectors produces a value of 26, for example, the value represented by carry vector 114a would be the integer portion of quotient 26/8 (i.e., 3).

As indicated previously, carry vector 114a is fully decoded in the preferred embodiment of circuit 100. In this embodiment, carry vector 114a includes a unique element for each potential value that could be represented by carry vector 114a. To determine the maximum number of elements required for carry vector 114a for any given implementation, recall that the maximum value (MV) of the summation in block 102a is $V*(2^G-1)$. To determine the number of elements required for carry vector 114a, it is necessary to first determine the lowest value K that satisfies the relationship $2^K>MV$. The value of K determined in this manner indicates the number of bits required to represent all possible values of the sum of V G-bit binary vectors. For the example of four 3-bit vectors, MV is 28 and K, therefore, is 5. Of the K bits required to represent the vector sum, G bits are represented by first output vector 106a. The remaining K-G bits must be represented by the carry vector 114a. To represent K-G bits in a fully decoded fashion, the carry vector 114a must include $2^{(K-G)}$ elements. In the preceding example, in which K=5 and G=3, the number of elements required of first carry vector 114a is $2^{(5-3)}$ (i.e., 4). Of these four elements, one element indicates a carry of 0*8 (i.e., 0), one element indicates a carry of 1*8 (i.e., 8), one element a carry of 2*8 (i.e., 16), and the final element indicates a carry of 3*8 (i.e., 24).

In one embodiment, first block 102a includes two stages of functionality. In the first stage, a set of G counters 108a through 108g (generically or collectively referred herein as bit counters 108) each generates a decoded high bit vector 112 that indicates the number of 1's received by the corresponding counter 108. In the depicted embodiment, the first counter 108a is configured to receive the lowest order bit from each of the input vectors $A_1$ through $A_v$, the second counter 108b receives the next lowest order bit from each of the input vectors, and so forth. Each counter 108 determines the number of received bits that are in a logical high state and asserts a corresponding element of high bit vector 112. Thus, if one of the bits received by first counter 108a is high and all others are low, block counter 108a asserts the element of high bit vector 112a that indicates one bit high. In this manner, each vector 112 indicates the contribution to the vector sum provided by each bit position. Thus, if the first high bit vector 112a (corresponding to the 1's bit position) indicates 3 high bits and the second high bit vector 112b (corresponding to the 2's bit position) indicates 2 high bits the total contribution to the vector sum indicated by high bit vectors 112a and 112b is $(3*1)+(2*2)=7$. The width of each high bit vector 112 is one greater than the number of vectors V, where the additional element is required to indicate zero high bits. The number of counter blocks 108 in first block 102a reflects the grouping organization of circuit 100. Thus, in a circuit 100 organized with G-bit groupings, there are G counter blocks 108 in first block 102a, second block 102b, and so forth.

The high bit vectors 112 that are output from counter blocks 108 provide the inputs to a first preliminary carry and summation circuit 110a. In the depicted embodiment, preliminary carry and summation circuit 110a includes a summation vector generator 104a and a carry vector generator 107a that produce first output vector 106a and first carry vector 114a respectively. Each element of first output vector 106a and carry vector 114a represents a sum of products based upon the high bit vectors 112a through 112g where a sum represents a Boolean OR and a product represents a Boolean AND. As an example, the element of first output vector used to indicate a decimal zero is the sum of all combinations of high bit vectors 112 that result in a decimal zero sum in the low order three bits. These combinations would include, for purposes of illustration with respect to a 3-bit grouping case, the combination of zero 1's, zero 2's, and zero 4's, the combination of zero 1's, two 2's, and one 4, the combination of two 1's, 3 2's and zero 4's, and so forth. Similarly each element of the carry vector 114a represents the output of a sum of products circuit. The element of carry vector representing a carry of 8, for example, is the output of a sum of products circuit that includes all combinations of high bit vectors 112 that indicate a sum S where $8 \leq S \leq 15$. The full decoded inputs provided to preliminary summation and carry circuit 110a greatly facilitate the implementation of this sum of products design because the appropriate elements of the high bit vectors 112 can be directly connected to the inputs of the sum of products circuits.

Circuit 100 includes a second block 102b that generates the second fully decoded output vector 106b. Second output vector 106b represents the value of the second set of G bits of the vector sum of the input vectors $A_1$ through $A_v$. Like first block 102a, second block 102b contains a set of G high bit counters 108. Each counter 108 in second block 102b receives bits of input vectors $A_1$ through $A_v$ corresponding to the second set of bit positions. In the example of 3-bit groupings, the counter blocks 108 of second block 102b are configured to receive the 4th, 5th, and 6th bits of each of the input vectors. The blocks 108 in second block 102b function in the same manner as the blocks 108 in first block 102a. The high bit vectors 112 output from blocks 108 of second block 102b form the inputs to a second preliminary carry and summation circuit 110b in the same manner that the outputs of blocks 108 in first block form the inputs of first preliminary carry and summation circuit 110a.

The depicted embodiment of second preliminary summation and carry circuit 110b includes a summation vector generator 104b functionally equivalent to the summation vector generator 104a of first preliminary summation and carry circuit 110a. In addition, second preliminary summation and carry circuit 110b includes multiple instances of carry generator circuits 107b, each of which functions in a manner similar to carry vector generator 107a of first preliminary summation and carry circuit 102a. The multiple instances of carry vector generator 107b are necessary because circuit 102b must produce multiple preliminary second carry vectors 208 from which one of the vectors is selected as second carry vector 114b. The vector 203 generated by second summation vector generator 104b is connected to a first multiplexer 206. The set of preliminary second carry vectors 208a through 208w are connected to the inputs of a second multiplexer 210. The first carry vector 114a provides the select signals for first and second multiplexer 206 and 210.

Figure 3:
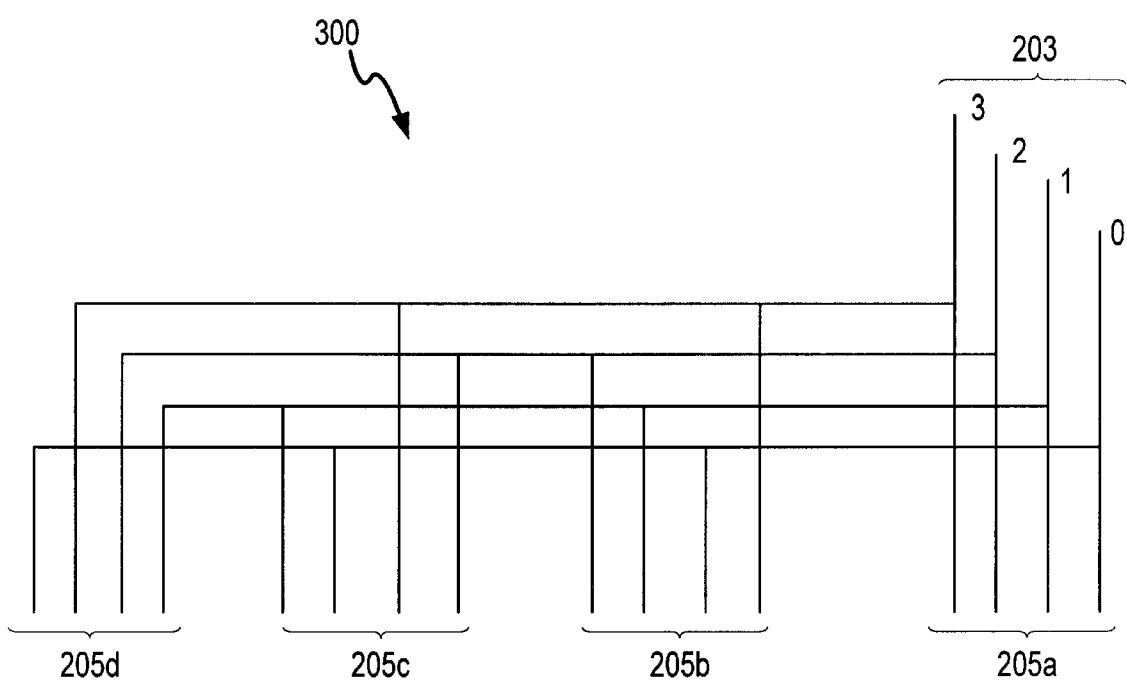
FIG. 3 is a diagram of an arrangement of interconnects suitable for use with the circuit of FIGS. 1 and 2.

The summation vector generator 104b produces a vector 203 in the same manner that vector generator 104a produces first output vector 106a. Unlike first output vector 106a, however, vector 203 is manipulated to form a set of vectors 205a through 205w. The set of vectors 205a through 205w provide the inputs to respective inputs of first multiplexer 206. In the depicted embodiment, the vector 205a is connected to the "0" input of multiplexer 206, vector 205b is connected to the "1" input, and vector 205w connected to the "w" input. In this configuration, vector 205a is selected as second output vector 106b if the $0^{th}$ element of first carry vector 114a is asserted, vector 205b is selected as second output vector 106b if the $1^{st}$ element of first carry vector 114a is asserted and so forth. In the preferred embodiment, the $0^{th}$ element of first carry vector 114a corresponds to a carry value of 0, the $1^{st}$ element corresponds to a carry of $1*2G$, and the $w^{th}$ element corresponds to a carry value of $w*2^G$ (where G is the number of bits in a grouping). In this embodiment, the vectors 205b through 205w are constructed from vector 205a using an arrangement of interconnects referred to herein as bit rotation circuit 300, an example of which is depicted in FIG. 3 for a case in which w=4. Circuit 300 effects a bit rotation of vector 203 to produce a set of preliminary summation vectors 205a through 205d such that each vector 205(n+1) is rotated by one bit position with respect to its adjacent vector 205n. If, for example, vector 203 has the four bit value "abcd", the initial preliminary summation vector 205a will also have the value "abed", vector 205b will have the value "bcda", vector 205c "cdab", and vector 205d "dabc". In the case of fully decoded binary vectors, in which only one element of the vector is asserted, it will be appreciated that the bit rotation circuit 300 has the effect of rotating the asserted bit by one element for each successive vector 205. If vector 205a provided to the "0" input of first multiplexer has a value of 00000010 (in a 3-bit grouping example) based upon the inputs to counter blocks 108 of second block 102b, the vector 205b that is connected to the "1" input of first multiplexer 206 will have a value of 00000100 in which the asserted bit has rotated from the second least significant bit to the third least significant bit. Similarly, if vector 205a has a value of 10000000, the vector 205b will have a value of 00000001. In this manner, circuit 300 generates a set of vectors 205a through 205w from an initial vector 203 that form the inputs of first multiplexer 206. Conceptually, the differing positions of the asserted bit in each adjacent neighbor vector 205 provided to first multiplexer 206 reflect the effect of the carry from the first block 102a. If the first carry vector 114a has its $J^{th}$ element asserted (thereby indicating a carry value of C where $C=J*2^G$), the carry value C must be added to the summation vector 203 generated by second block 102b. The addition of this carry value C to the sum represented by vector 203 is achieved by rotating vector 203 by J bit positions.

The multiple instances of carry vectors generators 107b are use to produce multiple preliminary second carry vectors 208 for delivery to second multiplexer 210 and selection by first carry vector 114a. Multiple instances of vector generators 107b are necessary because the relationship between adjacent vectors 208 is more complex than the simple relationship between adjacent summation vectors 205. Each vector generator 107b generates its corresponding output vector 208 based upon a different assumed value of carry vector 114a. Thus, each of the set of preliminary second carry vectors 208 generated by second preliminary and summation block 102b is generated by its own generator circuit 107b. The instance of generator circuit 107b connected to the "0" input of second multiplexer 210 generates a preliminary second carry vector 208a that is the correct carry if the first carry vector 114a has a value of "0" (i.e. carry vector 114a has its $0^{th}$ element asserted). The instance of vector generator circuit 107b connected to the "1" input of second multiplexer 210 generates a vector 208b that is the correct carry if first carry vector 114a has its $1^{st}$ element asserted, and so forth for the remaining vector generator circuits 107b and vectors 208. The first instance of vector generator 107b, which assumes a zero value of first carry vector 114a, is functionally equivalent to vector generator 107a. The actual value of carry vector 114a is then used to select among the set of vectors 208.

It will be appreciated that circuit 100 may include a third and possibly more blocks 102 essentially configured as second block 102b to achieve an adder circuit 100 suitable for use with varying input vector bit widths. In such an embodiment, the second carry vector 114b may be connected to a third block 102c (not shown) in a ripple carry fashion. In another embodiment, the second carry vector 114b may select a sum from a group of sums produced by multiple blocks 102 in a manner analogous to a carry select adder.

Figure 2:
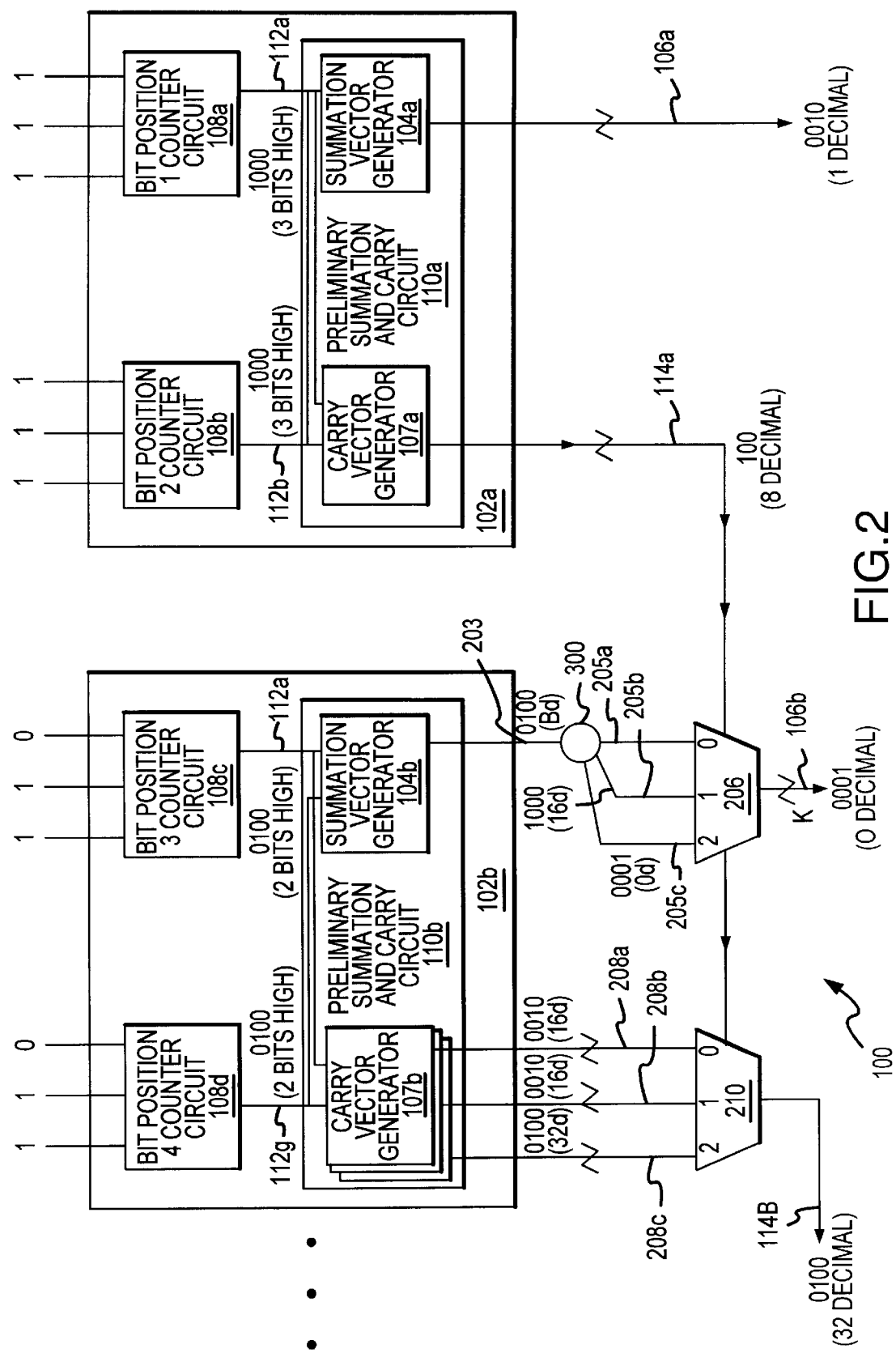
FIG. 2 is a block diagram illustrating one example of the vector summing circuit of FIG. 1.

Turning now to FIG. 2, an example is given for an implementation of circuit 100 for the case of three input vectors A1, A2, and A3 using 2-bit groupings. The values of input vectors A1, A2, and A3 are 0011, 1111, and 1111 respectively. The low order bits of each input vector are supplied to bit position 1 counter circuit 108a, the second lowest order bit positions are supplied to bit position counter 108b, and so forth. Bit position 1 counter circuit 108a produces a 4-wide high bit vector 112a. The uppermost bit position of vector 112a is asserted to indicate the bit position 1 counter circuit 108a received three bits that were high. Similarly for second high bit vector 112b.

In the 2-bit grouping organization of the embodiment depicted in FIG. 2, the vectors 112a and 112b are routed to first preliminary carry and summation circuit 110a. The first preliminary carry and summation circuit 110a generates a decoded output vector 106a that represents the lower 2 bits of the vector sum. In the depicted example, first preliminary carry and summation circuit 110a receives three bits high in the 2's bit position, for a decimal contribution of 6, and three bits high in the 1's bit position, for a decimal contribution of 3. Thus, the contribution to the vector sum provided by the lowest two bit positions of the input vectors in this case is decimal 9. First preliminary carry and summation circuit 110a generates a first output vector 106a that represents a decimal 1 and further generates a carry vector 114a that represents the decimal 8 that is carried to second block 102b. It is noted that the first output vector 106a is in a decoded form in which the decimal 1 value is indicated by asserting the element of vector 106a corresponding to decimal 1.

The high bit counters 108c and 108d receive the inputs from the third and fourth bit positions respectively of input vectors A1, A2, and A3. In the depicted example. each generates a high bit vector 112 indicating that 2 bits from the corresponding counter 108 are high. These decoded high bit vectors 112c and 112d are routed to summation vector generator 104b and carry vector generator 107b of second preliminary carry and summation circuit 110b, which produce a summation vector 203 and a set of carry vectors 208. In the depicted example, the summation vector 203 indicates a decimal value of 8 while the initial preliminary carry vector 208a indicates a carry value of decimal 16 based on the inputs to counters 108c and 108d. The unrotated vector 205a is connected to the zero input of first multiplexer 206. The remaining vectors provided to the inputs of first multiplexer 206 are derived from initial vector 205a by the bit rotation circuitry described above. In the depicted example, the initial vector 205a has a value of 0100 (decimal 8) and the carry vector 114a has its $2^{nd}$ element asserted thereby indicating a carry value of $2*2^2$ for a carry value of 8 decimal. The significance of carry vector 114a is incorporated into the vector sum by selecting the vector 205c in which the asserted bit has been rotated two bit positions with respect to initial vector 205a. The vector resulting from rotating the vector value 0100 twice is the vector value 0001 (after wraparound), which corresponds to decimal 0 indicating that the value of the second grouping of bits in the vector sum is 00 binary.

The first output vector 114a is also routed to second multiplexer 210 to select one of the set of carry vectors 208 generated by the multiple instances of carry vector generator 107b. The asserted $2^{nd}$ element of first carry vector 114a selects the vector 208c connected to the 2 input of multiplexer 210 as the second output vector 114b. As indicated in the drawing, the 0100 value of second output vector 114b represents a decimal value of 32. In other words, because the second output vector 106b represents the 4's bit position and the 8's bit position of the vector sum, the decoded carry vector 114b represents the number of 16's carried out of second block 102b. More generally, a carry vector 114k from the $k^{th}$ block 102k that has its $J^{th}$ element asserted represents a decimal value of $J*2^{(G*k)}$, where G is the number of bits per grouping. Coupled with this value, the value of second output vector 106b (decimal 0) and the value of first output vector 106a (decimal 1), it is seen that circuit 100 produces a set of decoded vectors representing the vector sum of 33, which is equal to the sum of input vectors A1, A2, and A3.

It will be apparent to those skilled in the art having the benefit of this disclosure that the present invention contemplates a circuit suitable for adding a set of multiple vectors. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of generating a vector sum comprising:
   receiving a set of input vectors, each input vector comprising at least a first bit group of at least two bits and a second bit group of at least two bits, each bit group comprising adjacent bits of its corresponding input vector;
   generating a first decoded summation vector and a first decoded carry vector, wherein the first summation and carry vectors are indicative of the value produced by summing the first bit groups of the input vectors;
   generating a preliminary second decoded summation and a preliminary second decoded carry vector indicative of the value produced by summing the second bit groups of the input vectors;
   generating a set of decoded second summations vectors and a set of decoded second carrying vectors wherein the set of second decoded summation vectors is derived from the preliminary second decoded summation vector; and
   selecting one of the set of decoded second summation vectors and one of the set of decoded second carry vectors based on the first decoded carry vector, wherein the selected second decoded summation vector is indicative of a second portion of the vector sum.

2. The method of claim 1, wherein generating the first and second decoded summation vectors includes generating decoded high bit count vectors indicative of the number of high bits in each bit position of the input vectors and computing the decoded summation vectors based thereon.

3. The method of claim 1, wherein generating the first and second decoded carry vectors includes generating decoded high bit count vectors indicative of the number of high bits in each bit position of the input vectors and computing the decoded carry vectors based thereon.

4. The method of claim 1, wherein generating the preliminary set of decoded second summation vector includes rotating the preliminary second decoded summation vector by one bit position.

5. The method of claim 1, wherein each group of the input vectors includes G bits, and further wherein each decoded summation vector includes $2^G$ elements, each element corresponding to one of the possible values of the portion of the vector summation.

6. The method of claim 5, wherein one of the elements of the summation vector is asserted and all other elements of the summation vector are negated.

7. The method of claim 1, wherein each group of the input vectors includes G bits and the set of input vectors comprises V vectors, and further wherein the first decoded carry vector includes $2^{(K-G)}$ elements where K is the smallest integer satisfying the relationship $2^K > V*(2^G-1)$.

8. The method of claim 6, wherein one of the elements of the carry vector is asserted and all other elements of the carry vector are negated.

9. A calculation circuit configured to receive a set of input vectors and to generate a vector sum, comprising:
    a set of counter blocks configured to generate decoded high bit vectors indicative of the number of high bits in each bit position of the input vectors wherein each high bit vector comprises exactly one asserted element;
    a preliminary carry and summation circuit adapted to generate a decoded summation vector and a decoded carry vector based on the high bit vectors, wherein the decoded summation vector represents the value of a portion of the vector sum.

10. The circuit of claim 9, wherein the calculation circuit includes a first block comprising a first portion of the set of counter blocks that receives a first portion of the input vectors and a second block comprising a second portion of the set of counter blocks that receives a second portion of the input vectors, wherein each block is configured to generate a respective carry vector and a respective summation vector.

11. The circuit of claim 10, configured wherein the carry vector from the first block selects one of a set of preliminary carry vectors generated by the second block as the second block's carry vector.

12. The circuit of claim 10, configured wherein the carry vector from the first block selects one of a set of preliminary summation vectors generated by the second block as the second block's summation vector.

13. The circuit of claim 12, configured wherein the second block generates an initial preliminary summation vector based upon the inputs to the second block and further wherein the second block includes a bit rotation interconnect scheme that generates the set of preliminary summation vectors from the initial preliminary summation vector.

14. The circuit of claim 13, configured wherein each preliminary summation vector in the set of preliminary summation vectors is rotated by one bit position with respect to an adjacent preliminary summation vector.

15. The circuit of claim 9, wherein the summation vector indicates the value of a first portion of the vector sum comprising G bits of the vector sum, and further wherein the summation vector comprises $2^G$ bits of information.

16. A method of adding multiple input vectors comprising:
    generating a first decoded summation vector indicative of a first portion of a vector sum;
    generating a first decoded carry vector indicative of the carry from a first portion of the vector sum;
    generating a decoded initial preliminary second summation vector corresponding to a second portion of the vector sum;
    generating a set of preliminary second summation vectors from the initial preliminary second summation vector wherein each of the set of preliminary second summation vectors is rotated by one bit position with respect to an adjacent preliminary second summation vector; and
    selecting with the first carry vector one of the set of preliminary second summation vectors as a second summation vector.

17. The method of claim 16, wherein the first carry vector indicates the number of bits positions the selected second summation vector is rotated with respect to the initial preliminary second summation vector.

18. The method of claim 17, wherein generating the first decoded summation vector includes generating high bit vectors indicative of the number of bits that are high in each bit position of the input vectors.

19. An adder circuit including an input configured to receive a set of input vectors, the circuit comprising:
    a set of high bit counters coupled to the adder circuit input and configured to generate a set of decoded high bit vectors having one bit asserted and all other bits non-asserted, the high bit vectors being indicative of the number of bits high in each bit position of the input vectors; and
    a preliminary summation and carry vector circuit configured to receive at least one of the high bit vectors and, responsive thereto, to generate a preliminary summation vector and a preliminary carry vector indicative of a sum and carry produced by adding at least a portion of each of the input vectors.

20. The circuit of claim 19, wherein the preliminary summation vector and the preliminary carry vectors are decoded vectors.

* * * * *